United States Patent
Luo

(10) Patent No.: US 10,605,822 B2
(45) Date of Patent: Mar. 31, 2020

(54) SYSTEM FOR ESTIMATING AIRSPEED OF AN AIRCRAFT BASED ON A WEATHER BUFFER MODEL

(71) Applicant: The Boeing Company, Chicago, IL (US)

(72) Inventor: Jia Luo, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 373 days.

(21) Appl. No.: 15/620,239

(22) Filed: Jun. 12, 2017

(65) Prior Publication Data

US 2018/0356437 A1 Dec. 13, 2018

(51) Int. Cl.
| | |
|---|---|
| *G01P 5/14* | (2006.01) |
| *G06F 17/50* | (2006.01) |
| *G01P 5/00* | (2006.01) |
| *G01P 21/02* | (2006.01) |
| *G01P 13/02* | (2006.01) |

(52) U.S. Cl.
CPC ............ *G01P 5/14* (2013.01); *G01P 5/00* (2013.01); *G01P 13/025* (2013.01); *G01P 21/025* (2013.01); *G06F 17/5009* (2013.01); *G06F 2217/16* (2013.01)

(58) Field of Classification Search
CPC .. G01P 5/14; G01P 5/00; G01P 13/025; G01P 21/025; G06F 17/5009; G06F 2217/16
See application file for complete search history.

(56) References Cited

U.S. PATENT DOCUMENTS

| | | | | |
|---|---|---|---|---|
| 8,914,164 | B1 * | 12/2014 | Nathan | G01P 5/175 |
| | | | | 701/7 |
| 10,006,928 | B1 * | 6/2018 | Hagerott | G01P 13/025 |
| 2010/0100260 | A1 | 4/2010 | McIntyre et al. | |
| 2018/0356439 | A1 * | 12/2018 | Luo | G01P 5/16 |

FOREIGN PATENT DOCUMENTS

WO 2016037035 A1 3/2016

OTHER PUBLICATIONS

EPO, Extended European search report, dated Oct. 4, 2018.

* cited by examiner

*Primary Examiner* — Regis J Betsch
(74) *Attorney, Agent, or Firm* — Vivacqua Law

(57) ABSTRACT

A system and method for estimating a plurality of airspeed parameters of an aircraft is disclosed. The system comprises one or more processors and a memory coupled to the processor. The memory storing data comprising a database and program code that, when executed by the one or more processors, causes the system to receive a plurality of operating parameters that each represent an operating condition of the aircraft. The system is further caused to determine a model based dynamic pressure based on the operating parameters. The model based dynamic pressure is estimated based on steady flight conditions of the aircraft. The system is further caused to determine a bridge based dynamic pressure based on at least a temperature deviation and an inertial speed vector. The bridge based dynamic pressure is estimated for extreme flight conditions of the aircraft.

20 Claims, 7 Drawing Sheets

SYSTEM FOR ESTIMATING AIRSPEED OF AN AIRCRAFT BASED ON A WEATHER BUFFER MODEL

FIELD

The disclosed system and method relate to a system for estimating airspeed of an aircraft and, more particularly, to a system that includes a weather buffer model for estimating airspeed during extreme flight conditions.

BACKGROUND

A pitot tube or probe is typically mounted on a vehicle and measures the velocity of a vehicle relative to a fluid in which the vehicle is moving. In one application, a pitot probe is mounted upon an aircraft and measures the velocity of the aircraft relative to the air mass during flight. Pitot probes generally include a hollow tube that defines an open end pointing in the direction of fluid flow or vehicle movement. The hollow tube of the pitot probe contains a fluid, such as air in the case of an aircraft. The pressure within the pitot probe provides a stagnation pressure measurement, which is also called total pressure. The total pressure is combined with a static pressure, which is typically measured at a different location on the aircraft fuselage, or on the side of the pitot probe in the case of a combined pitot-static probe, in order to determine an impact pressure. The impact pressure is used to determine the airspeed of the aircraft.

Sometimes pitot probe based airspeed systems may produce incorrect airspeed readings. The incorrect reading may be caused by issues such as probe contamination, damage to the probe, or maintenance issues. Some examples of probe contamination include, but are not limited to, ice, volcanic ash, and insect invasion. Systems that estimate airspeed based on a model of an aircraft currently exist, however these systems may not be able to calculate an accurate airspeed if the aircraft is operating at extreme flight conditions. Extreme flight conditions may include unsteady or highly dynamic conditions that are typically created as the aircraft performs a maneuver, or if the aircraft experiences significant forces due to ambient winds or turbulence. Extreme flight conditions are usually determined based on the rate of change of an angle of attack, an angle of sideslip, or a bank angle. The traditional approach is to freeze or keep the airspeed estimate constant while the aircraft operates at the extreme conditions. However, if the aircraft continues to operate during the extreme conditions for more than a few seconds, this may affect the accuracy of the airspeed readings.

SUMMARY

The disclosure is directed to an improved system for estimating the airspeed of an aircraft, especially during at extreme flight conditions. In one example, a system for estimating a plurality of airspeed parameters of an aircraft is disclosed. The system comprises one or more processors and a memory coupled to the processor. The memory storing data comprises a database and program code that, when executed by the one or more processors, causes the system to receive a plurality of operating parameters that each represent an operating condition of the aircraft. The system is further caused to determine a model based dynamic pressure based on the operating parameters. The model based dynamic pressure is based on steady flight conditions of the aircraft. The system is further caused to determine a bridge based dynamic pressure based on at least a temperature deviation and an inertial speed vector. The bridge based dynamic pressure is based on extreme flight conditions of the aircraft. The system is caused to assess a steadiness of the aircraft during operation based on at least one of an angle of attack, an angle of sideslip, and a bank angle, where the steadiness is indicative of the extreme flight conditions of the aircraft. The system is also caused to determine that the aircraft is operating at the extreme flight conditions based on the steadiness. Finally, in response to determining the aircraft is operating at the extreme flight conditions, the system estimates the plurality of airspeed parameters based on the bridge based dynamic pressure.

In another example, a method of estimating a plurality of airspeed parameters of an aircraft is disclosed. The method includes receiving a plurality of operating parameters that each represent an operating condition of the aircraft by a computer. The method also includes determining, by the computer, a model based dynamic pressure based on the operating parameters. The model based dynamic pressure is based on steady flight conditions of the aircraft. The method also includes determining, by the computer, a bridge based dynamic pressure based on at least a temperature deviation and an inertial speed vector. The bridge based dynamic pressure is based on extreme flight conditions of the aircraft. The method includes assessing a steadiness of the aircraft during operation based on at least one of an angle of attack, an angle of sideslip, and a bank angle. The steadiness is indicative of the extreme flight conditions of the aircraft. The method includes determining, by the computer, that the aircraft is operating at the extreme flight conditions based on the steadiness. Finally, in response to determining the aircraft is operating at the extreme flight conditions, the method includes estimating, by the computer, the plurality of airspeed parameters based on the bridge based dynamic pressure.

Other objects and advantages of the disclosed method and system will be apparent from the following description, the accompanying drawings and the appended claims.

DETAILED DESCRIPTION

Figure 1:
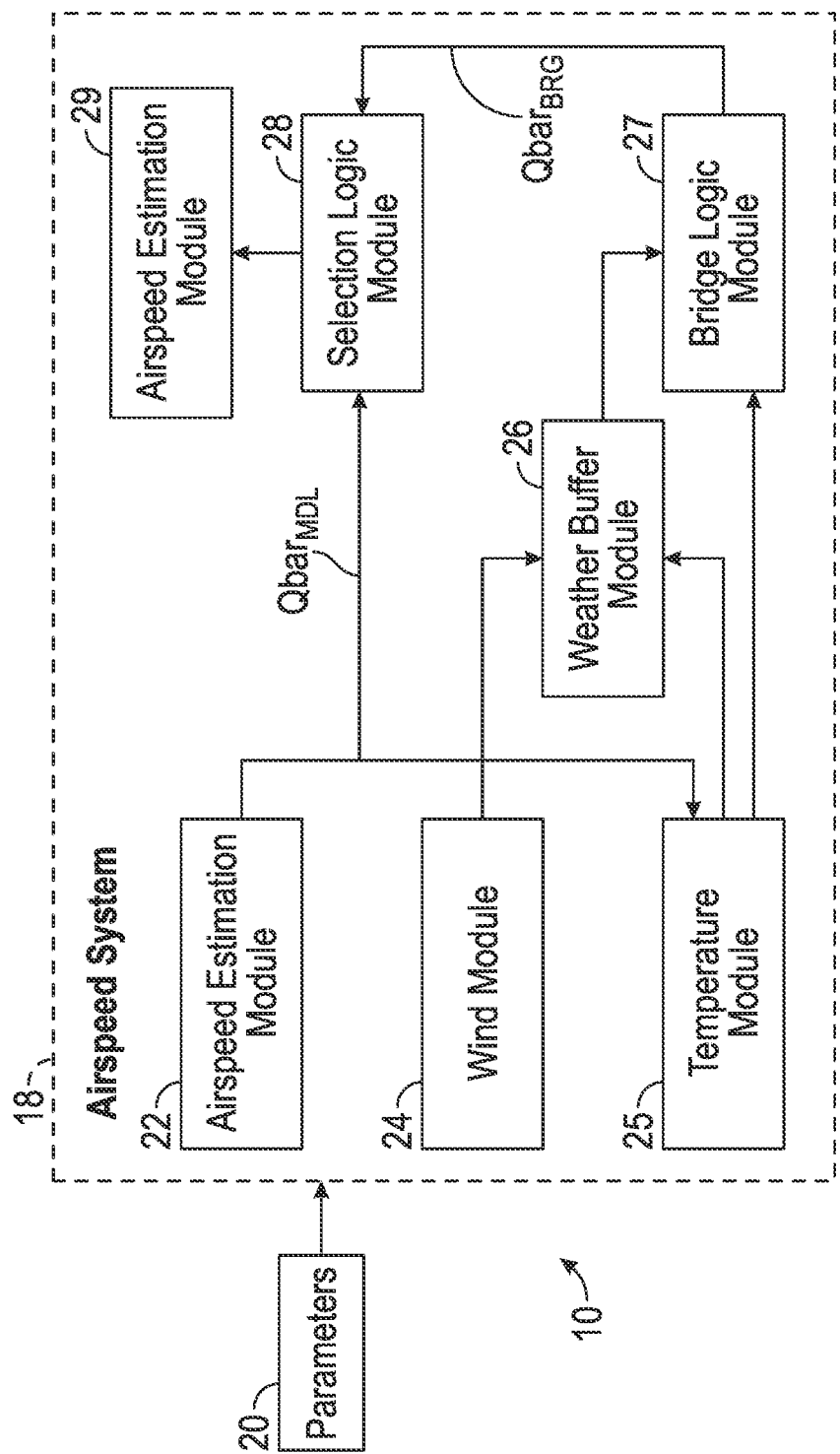
FIG. 1 is an exemplary schematic block diagram of the disclosed airspeed calculation system of an aircraft including an airspeed estimation module and a weather buffer module.

FIG. 1 is an exemplary schematic block diagram of the disclosed airspeed system 10. The airspeed system 10 estimates airspeed parameters of an aircraft 18 constantly, without relying upon traditional pitot probe measurements. The airspeed system 10 receives as input a plurality of operating parameters 20, which are each described in greater detail below. The parameters 20 are each representative of a particular operating condition of the aircraft 18. The airspeed system 10 includes an airspeed estimation module 22, a wind module 24, a temperature module 25, a weather buffer module 26, a bridge logic module 27, a selection logic module 28, and an airspeed estimation module 29.

The airspeed system 10 estimates the airspeed parameters, which are used for constantly calculating the airspeed of the aircraft 18. Specifically, the airspeed system 10 estimates the airspeed parameters during normal or steady flight conditions as well extreme flight conditions. Extreme flight conditions include unsteady or highly dynamic conditions created as the aircraft 18 performs a maneuver, or as the aircraft 18 encounters significant force due to ambient winds or turbulence. Extreme flight conditions are determined based on an angle of attack α, an angle of sideslip β, bank angle ϕ, and their rates of change, and is explained in greater detail below.

Figure 4:
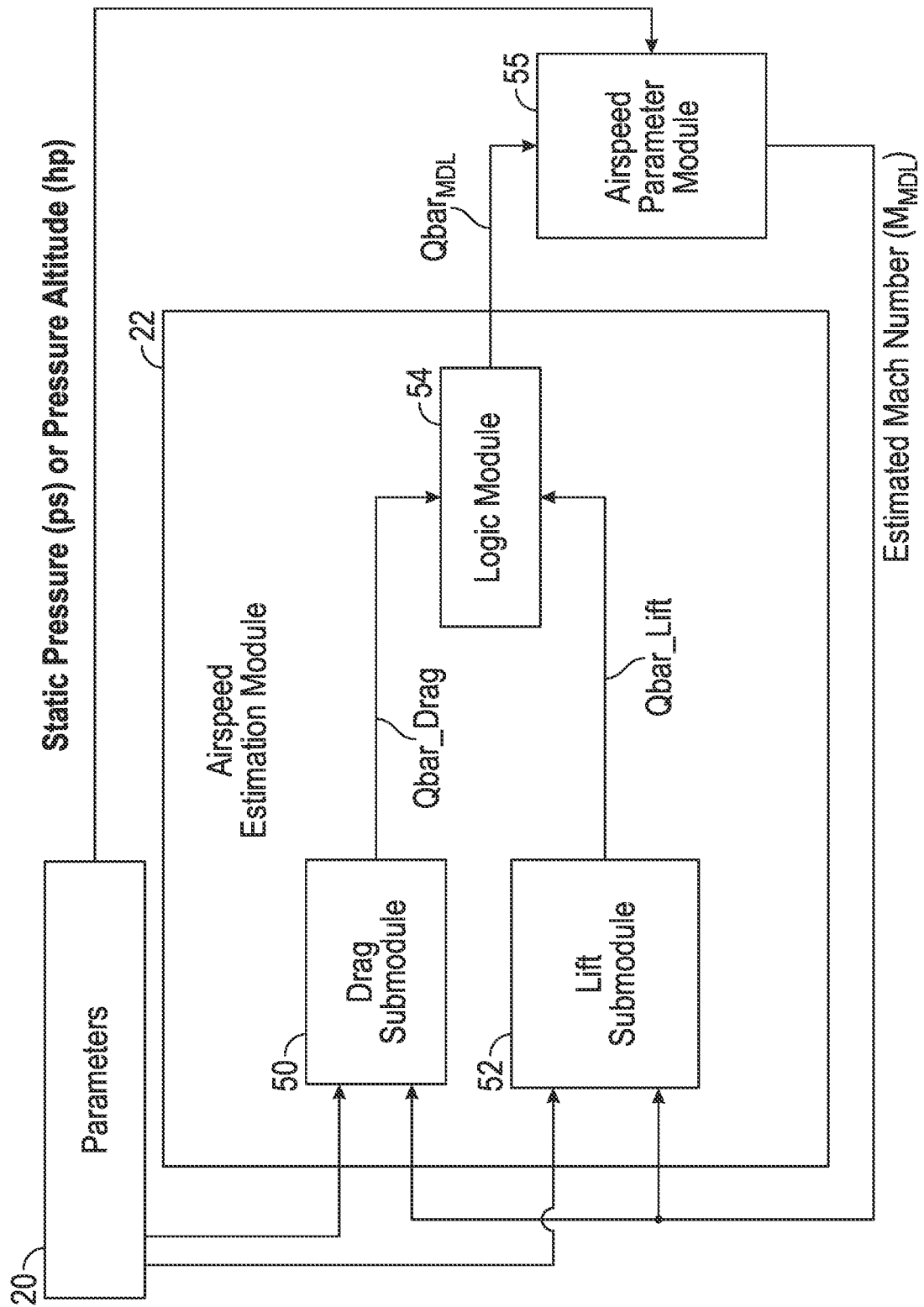
FIG. 4 is an exemplary block diagram of the airspeed estimation module shown in FIG. 1, including a drag submodule, a lift submodule, and a logic submodule.

The airspeed estimation module 22 estimates a model based dynamic pressure $Qbar_{MDL}$ based on the operating parameters 20. The model based dynamic pressure $Qbar_{MDL}$ is based on steady flight conditions of the aircraft 18. That is, in other words, the airspeed estimation module 22 estimates the model based dynamic pressure $Qbar_{MDL}$ with the assumption that the aircraft 18 is not operating at extreme flight conditions and is operating normally. The model based $Qbar_{MDL}$ is determined based on any number of approaches. In one exemplary embodiment as shown in FIG. 4, the model based $Qbar_{MDL}$ is determined based on separate drag and lift models of the aircraft 18. The drag and lift models are based on high speed conditions and low speed conditions of the aircraft 18. Specifically, the airspeed system 10 determines that the aircraft 18 operates at high speed conditions in response to determining that flaps 31 of the aircraft 18 (FIG. 2) are retracted, and in response to an estimated Mach number $M_{MDL}$ having a value greater than 0.4. The airspeed system 10 determines that the aircraft 18 operates at low speed conditions in response to determining that the flaps of the aircraft 18 are not retracted, or in response to the estimated Mach number $M_{MDL}$ having a value equal to or less than 0.4.

Turning back to FIG. 1, the weather buffer module 26 estimates a bridge based dynamic pressure $Qbar_{BRG}$ based on the aircraft 18 operating during extreme flight conditions. The model based dynamic pressure $Qbar_{MDL}$, which is based on steady operating conditions of the aircraft 18, may no longer produce accurate airspeed parameters during extreme flight conditions. Referring to both FIGS. 1 and 2, the weather buffer module 26 is based on an earth-axis frame $X_E$, $Y_E$, $Z_E$ of the aircraft 18, where the $X_E$ axis points to the north direction, the $Y_E$ axis points to the east direction, and the $Z_E$ axis points to the vertical downward direction. The weather buffer module 26 also includes the wind speed vector and temperature deviation from the standard day conditions, which are based on the International Standard Atmosphere (ISA), and are described in detail below.

The airspeed estimation module 29 determines airspeed parameters, which include the estimated dynamic pressure $Qbar_{EST}$, Mach number $M_{EST}$, an equivalent airspeed $Veas_{EST}$, an impact pressure $Qc_{EST}$, a calibrated airspeed $Vcas_{EST}$, and a true airspeed $V_{tEST}$ of the aircraft 18. The airspeed estimation module 29 determines the airspeed parameters based on either the model based dynamic pressure $Qbar_{MDL}$ or the bridge based dynamic pressure $Qbar_{BRG}$.

The operating parameters 20 include an angle of attack α, an angle of sideslip β, a plurality of control surface positions, a stabilizer surface position, a flap position, a landing gear position, static pressure ps, engine speed N1, total air temperature $T_{TOT}$, aircraft weight W, accelerations or load factors, flight path angle γ, pitch angle θ, bank angle ϕ, heading angle Ψ, and a sensed earth-axis inertial speed vector $\vec{VI_E}$. In one embodiment, a pressure altitude hp may be used instead of the static pressure ps, and an engine pressure ratio EPR may be used instead of the engine speed N1. Control surfaces of the aircraft 18 include, without limitation, ailerons, flaperons, rudders, spoilers, elevators, trim devices, and flaps. The control surface positions represent the position of moveable flight control surfaces of the aircraft 18. In the embodiments as described the control surface position may refer to the position of spoilers 8 (FIG. 2) and a rudder 6 (FIG. 2) of the aircraft 18.

Figure 2:
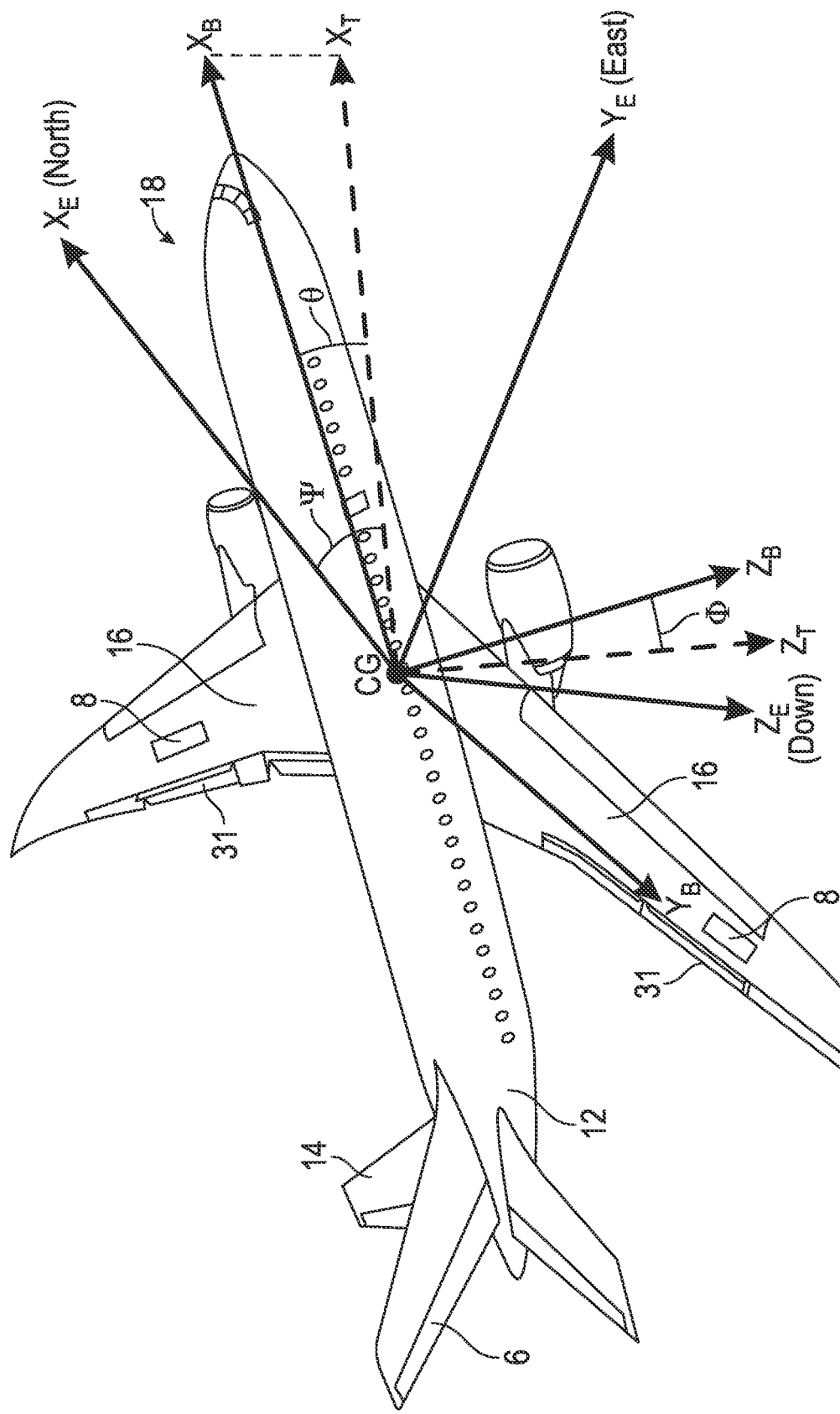
FIG. 2 is an illustration of the aircraft shown in FIG. 1, where a body-axis and an earth-axis of the aircraft are shown.

Referring now to FIG. 2, the stabilizer surface position is a measure of an incidence angle of the horizontal stabilizer 14 relative to a body 12 of the aircraft 18, as seen in a side view. The flap position is indicative of position of a plurality of trailing edge flaps 31 (FIG. 2) of the wings 16. More specifically, the flap position indicates whether the trailing edge flaps 31 are in a retracted position. In one embodiment, the aircraft 18 includes a three-position landing gear lever, where the three positions are DOWN, UP, and OFF. The landing gear position would be DOWN, UP, or some value in-between if the gears are in transit. The total air temperature $T_{TOT}$ may also be referred to as the stagnation temperature, and is measured by a total air temperature probe (not illustrated) mounted on the aircraft 18.

The load factor is the ratio of total aerodynamic and propulsive force generated by the aircraft 18 to the total weight of the aircraft 18. For example, during straight and level flight of the aircraft 18, the total lift is equal to the total weight. Accordingly, the load factor is one gravity. The acceleration or load factor is determined by one or more accelerometers. However, many types of accelerometers actually measure the load factor. If the accelerometers do truly measure accelerations, then the corresponding load factor is calculated by subtracting the acceleration due to gravity along each axis. The inertial speed vector $\vec{VI_E}$ is representative of the aircraft's speed vector over ground, and is sensed by an inertial navigation system (INS) of the aircraft 18. An INS is a navigation system that does not depend on external or radio measurements, and instead determines position, velocity, and attitude based on acceleration, which is measured by accelerometers, and rate of rotation, which is measured by gyroscopes.

FIG. 2 also illustrates a body-axis frame $X_B$, $Y_B$, $Z_B$, the earth-axis frame $X_E$, $Y_E$, $Z_E$, and a center of gravity CG of the aircraft 18. An axis $X_T$ is a projection of the body-axis $X_B$ onto a horizontal plane. The plane is defined by the earth-axes $X_E$ and $Y_E$ (i.e., the surface of the Earth). An axis $Z_T$ axis is substantially perpendicular to the body-axis $X_B$, and resides in a plane defined by the body-axis $X_B$ axis and an axis $X_T$. The pitch angle θ is measured between the $X_B$ and the $X_T$ axes, the bank angle ϕ is measured between the $Z_B$ and the $Z_T$ axes, and the heading angle Ψ is measured between the $X_E$ and the $X_T$ axes.

Turning back to FIG. 1, all of the parameters 20 may be available as inputs from sensors. However, sometimes the angle of attack α, the angle of sideslip β, and the static pressure ps may be calculated or estimated values instead of sensed values. Specifically, the static pressure ps may be measured by a reliable static source such a static port or, in another embodiment the static pressure ps is calculated based on the geometric altitude of the aircraft 18. In one non-limiting embodiment, the geometric altitude may be obtained from a global positioning system (GPS). In one embodiment, the angle of attack α may be derived from inertial measurements of the aircraft 18. However, in another approach, the angle of attack α may also be provided by angle of attack sensors. The angle of sideslip β may be measured by a sensor, or estimated based on aerodynamic side force model of the aircraft 18. In another embodiment, the angle of sideslip β is derived from inertial measurements.

Continuing to refer to FIG. 1, in one embodiment the airspeed system 10 may be used as a primary source to determine the airspeed of the aircraft 18. In another approach, the airspeed system 10 may be used as an independent source of airspeed, and is used to monitor another source of airspeed such as, for example, a pitot tube. Specifically, the airspeed system 10 may be used to determine the accuracy of a pitot tube (not illustrated). In still another embodiment, the airspeed system 10 may be used as only one of multiple airspeed sources to identify inaccurate airspeed sources.

Figure 3:
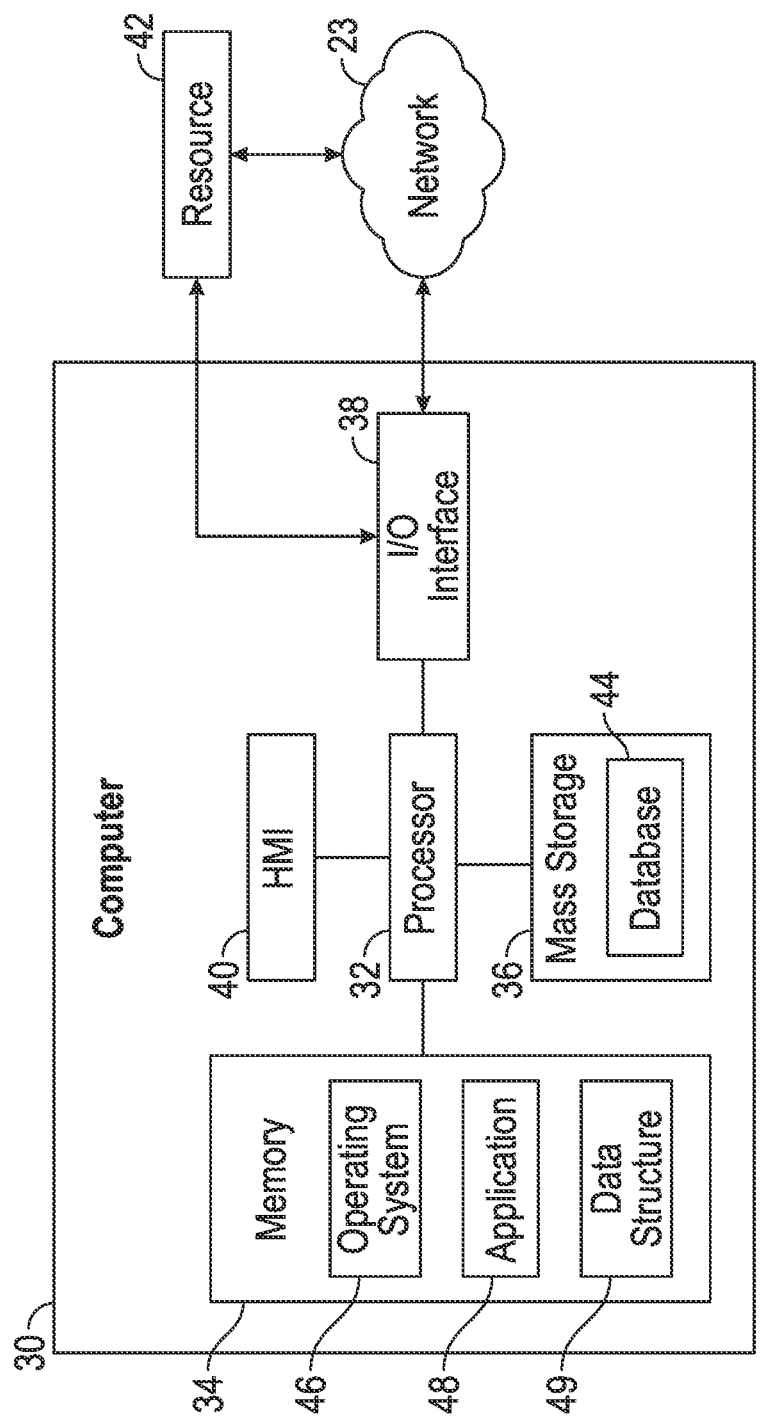
FIG. 3 is an illustration of a computer system used by the airspeed calculation system of FIG. 1.

Referring now to FIG. 3, the airspeed system 10 is implemented on one or more computer devices or systems, such as exemplary computer system 30. The computer system 30 includes a processor 32, a memory 34, a mass storage memory device 36, an input/output (I/O) interface 38, and a Human Machine Interface (HMI) 40. The computer system 30 is operatively coupled to one or more external resources 42 via the network 23 or I/O interface 38. External resources may include, but are not limited to, servers, databases, mass storage devices, peripheral devices, cloud-based network services, or any other suitable computer resource that may be used by the computer system 30.

The processor 32 includes one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 34. Memory 34 includes a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 36 includes data storage devices such as a hard drive, optical drive, tape drive, volatile or non-volatile solid state device, or any other device capable of storing information.

The processor 32 operates under the control of an operating system 46 that resides in memory 34. The operating system 46 manages computer resources so that computer program code embodied as one or more computer software applications, such as an application 48 residing in memory 34, may have instructions executed by the processor 32. In an alternative embodiment, the processor 32 may execute the application 48 directly, in which case the operating system 46 may be omitted. One or more data structures 49 also reside in memory 34, and may be used by the processor 32, operating system 46, or application 48 to store or manipulate data.

The I/O interface 38 provides a machine interface that operatively couples the processor 32 to other devices and systems, such as the network 23 or external resource 42. The application 48 thereby works cooperatively with the network 23 or external resource 42 by communicating via the I/O interface 38 to provide the various features, functions, applications, processes, or modules comprising embodiments of the invention. The application 48 also includes program code that is executed by one or more external resources 42, or otherwise rely on functions or signals provided by other system or network components external to the computer system 30. Indeed, given the nearly endless hardware and software configurations possible, persons having ordinary skill in the art will understand that embodiments of the invention may include applications that are located externally to the computer system 30, distributed among multiple computers or other external resources 42, or provided by computing resources (hardware and software) that are provided as a service over the network 23, such as a cloud computing service.

The HMI 40 is operatively coupled to the processor 32 of computer system 30 in a known manner to allow a user to interact directly with the computer system 30. The HMI 40 may include video or alphanumeric displays, a touch screen, a speaker, and any other suitable audio and visual indicators capable of providing data to the user. The HMI 40 also includes input devices and controls such as an alphanumeric keyboard, a pointing device, keypads, pushbuttons, control knobs, microphones, etc., capable of accepting commands or input from the user and transmitting the entered input to the processor 32.

A database 44 may reside on the mass storage memory device 36, and may be used to collect and organize data used by the various systems and modules described herein. The database 44 may include data and supporting data structures that store and organize the data. In particular, the database 44 may be arranged with any database organization or structure including, but not limited to, a relational database, a hierarchical database, a network database, or combinations thereof. A database management system in the form of a computer software application executing as instructions on the processor 32 may be used to access the information or data stored in records of the database 44 in response to a query, where a query may be dynamically determined and executed by the operating system 46, other applications 48, or one or more modules.

FIG. 4 is a block diagram illustrating the airspeed estimation module 22 shown in FIG. 1. The airspeed estimation module 22 includes submodules 50, 52, 54. The submodules 50, 52, 54 are shown as distinct components, which may indicate the use of modular programming techniques. However, the software design may decrease the extent to which the submodules 50, 52, 54 are distinct by combining at least some program functions of multiple modules into a single module. Moreover, the functions attributed to the submodules 50, 52, 54 may be distributed in other ways, or on other systems than those depicted. Thus, embodiments of the invention are not limited to the specific arrangement of systems or modules shown in FIG. 4.

The airspeed estimation module 22 receives as input the operating parameters 20, which each represent an operating condition of the aircraft 18 (FIG. 1), and determines the model based dynamic pressure $Qbar_{MDL}$ based on the operating parameters 20. The model based dynamic pressure $Qbar_{MDL}$ is based on steady flight conditions of the aircraft 18. The submodule 50 is a drag submodule 50 that is used to estimate a drag based dynamic pressure $Qbar_{drag}$, which is based on on a drag model of the aircraft 18 (FIG. 1). The drag based dynamic pressure $Qbar_{drag}$ is used to determine the dynamic pressure Qbar unless the aircraft 18 operates at low speed conditions. The submodule 52 is a lift submodule 52 that determines a low speed dynamic pressure $Qbar_{lift}$ assuming the aircraft 18 operates at low speed conditions. The logic submodule 54 is a speed logic switch. The submodule 54 receives as input the dynamic pressure $Qbar_{drag}$ determined by the drag submodule 50 and the dynamic pressure $Qbar_{lift}$ determined by the lift submodule 52, and determines the model based dynamic pressure $Qbar_{MDL}$ based on the operating conditions of the aircraft 18.

As explained below, the airspeed estimation module 55 determines the model based dynamic pressure $Qbar_{MDL}$, Mach number $M_{MDL}$, the equivalent airspeed $Veas_{MDL}$, the impact pressure $Qc_{MDL}$, the calibrated airspeed $Vcas_{MDL}$, and the true airspeed of the aircraft $Vt_{MDL}$ based on the inputs. As seen in FIG. 4, the estimated Mach number $M_{MDL}$ is returned to the submodules 50, 52 of the dynamic pressure module 22 as feedback input.

Calculation of the dynamic pressure $Qbar_{drag}$ determined by the drag submodule 50 will now be discussed. The drag submodule 50 receives as input the operating conditions 20 (FIG. 1). Specifically, the drag submodule 50 receives as input the angle of attack α, the angle of sideslip β, the control surface positions, the stabilizer surface position, the flap position, the landing gear position, and the estimated Mach number $M_{MDL}$ (from the airspeed estimation module 55). The drag submodule 50 determines a stability-axis drag coefficient $C_D$ based on the inputs and a plurality of components $C_{D1}$-$C_{D6}$. The stability-axis drag coefficient $C_D$ quantifies a stability-axis drag of the aircraft 18 created during high speed conditions. As explained below, the model based dynamic pressure $Qbar_{MDL}$ is determined based on the stability-axis drag coefficient $C_D$.

The components $C_{D1}$-$C_{D6}$ are tabular functions of the inputs (i.e., the angle of attack α, the angle of sideslip β, the control surface positions, the stabilizer surface position, the flap position, the landing gear position, and the estimated Mach number $M_{MDL}$). In one embodiment, the stability-axis drag coefficient $C_D$ is determined by Equation 1 as:

$$C_D = C_{D1}(\alpha, M_{MDL}) + C_{D2}(Flap, M_{MDL}) + C_{D3}(Gear, M_{MDL}) + C_{D4}(Spoiler, \alpha, M_{MDL}) + C_{D5}(stabilizer, \alpha, M_{MDL}) + C_{D6}(rudder, \beta, M_{MDL}) \quad \text{Equation 1}$$

where Flap represents the flap position indicative of the position of trailing edge flaps 31 (FIG. 2) of the wings 16, Gear represents the landing gear position, Spoiler represents the position of spoilers 8 (FIG. 2), Stabilizer represents the stabilizer surface position, and rudder represents the position of the rudder 6 of the aircraft 18 (FIG. 2).

The components $C_{D1}$-$C_{D6}$ are each determined based on respective lookup tables saved in memory 34 of the airspeed system 10 (FIG. 3). For example, the component $C_{D1}$ is determined by taking the specific values of the angle of attack α and the estimated Mach number $M_{MDL}$, finding these values on one of the lookup tables, and then determining the component $C_{D1}$ based on the specific values of the angle of attack α and the estimated Mach number $M_{MDL}$. Moreover, the components $C_{D4}$-$C_{D6}$ are each determined based on a three-dimensional lookup table. In an alternative embodiment, the components $C_{D1}$-$C_{D6}$ are determined based on mathematical functions, such as polynomials.

The drag submodule 50 determines a forward stability-axis thrust component $T_{XS}$ based on the engine speed N1 or engine pressure ratio EPR, the static pressure ps or altitude, the total air temperature $T_{TOT}$, the Mach estimate $M_{MDL}$, the angle of attack α, and the angle of sideslip β. Additionally, the drag submodule 50 also receives as input a factor of engine incidence angle $x_{FCT}$, which is with respect the body-axis $X_B$ (FIG. 2) and a factor of engine incidence angle $Z_{FCT}$, which is with respect to the body-axis $Z_B$ (FIG. 2). Both the factors of engine incidence angles $x_{FCT}$, $Z_{FCT}$ are geometric constants, and are fixed values based on the specific installation of a turbojet engine of the aircraft 18 (not illustrated).

The gross thrust of the aircraft turbojet engine (not illustrated in the figures) is the thrust produced by the outlet flow of an aircraft turbojet engine. The drag submodule 50 determines two gross thrust components, $G_{XB}$ and $G_{ZB}$. The gross thrust component $G_{XB}$ is the gross thrust with respect to the body-axis $X_B$ (FIG. 2), and the gross thrust component $G_{ZB}$ is the gross thrust with respect to the body-axis $Z_B$ (FIG. 2). The gross thrust component $G_{XB}$ is determined based on Equation 2, and the gross thrust component $G_{ZB}$ is determined based on Equation 3. Equations 2 and 3 are listed below as:

$$G_{XB} = T1(N1, ps, M_{MDL}, T_{TOT}) x_{XFCT} \quad \text{Equation 2}$$

$$G_{ZB} = T1(N1, ps, M_{MDL}, T_{TOT}) z_{XFCT} \quad \text{Equation 3}$$

where T1 is a tabular function of the engine speed N1, the static pressure ps, the estimated Mach number $M_{MDL}$, and the total air temperature $T_{TOT}$.

The drag submodule 50 further determines a ram drag $R_D$. The ram drag $R_D$ represents the drag caused by the momentum of incoming air into the turbojet engine of the aircraft 18 (not illustrated). The ram drag $R_D$ is determined by Equation 4, which is:

$$R_D = T2(N1, ps, M_{MDL}, T_{TOT}) \quad \text{Equation 4}$$

where T2 is a tabular function of the engine speed N1, the static pressure ps, the estimated Mach number $M_{MDL}$, and the total air temperature $T_{TOT}$.

The drag submodule 50 determines the forward stability axis thrust component $T_{XS}$ by subtracting the ram drag from the engine gross thrust. The ram drag is the drag caused by the momentum of incoming air into the turbojet engine of the aircraft 18, while the engine gross thrust is the thrust produced by the aircraft turbojet engine during static conditions. More specifically, the forward stability axis thrust component $T_{XS}$ is determined by Equation 5, which is:

$$T_{XS} = G_{XB} \cos\alpha + G_{ZB} \sin\alpha - R_D \cos\beta \quad \text{Equation 5}$$

The drag submodule 50 estimates the dynamic pressure $Qbar_{drag}$ created as the aircraft 18 operates as high speed conditions based on the stability-axis drag coefficient $C_D$, the forward stability axis thrust component $T_{XS}$, the aircraft weight W, the acceleration/load factors Nx, Nz, the angle of attack α, and a reference area $S_{ref}$. The reference area $S_{ref}$ represents the wing planform area. The dynamic pressure $Qbar_{drag}$ is based on the force along a stability-axis of the aircraft 18. Equation 6 determines the load factor along the stability axis $N_{XS}$, and Equation 7 determines the dynamic pressure $Qbar_{drag}$ created at high speed conditions.

$$N_{XS} = N_X \cos\alpha - N_Z \sin\alpha \quad \text{Equation 6}$$

$$Qbar_{drag} = (T_{XS} - N_{XS} W) / (C_D S_{ref}) \quad \text{Equation 7}$$

Calculation of the dynamic pressure $Qbar_{lift}$ determined by the lift submodule 52 will now be discussed. The lift submodule 52 determines a body-axis lift coefficient $C_L$ that corresponds to a lift created along the vertical body-axis $Z_B$ (FIG. 2) during low speed operation of the aircraft 18. As explained below, the model based dynamic pressure $Qbar_{MDL}$ is determined based on the body-axis lift coefficient $C_L$.

The body-axis lift coefficient $C_L$ is determined based on the angle of attack α, the angle of sideslip β, the control surface positions, the stabilizer surface position, the flap position, the landing gear position, and the estimated Mach number $M_{MDL}$. Similar to the stability-axis drag coefficient $C_D$, the body-axis lift coefficient $C_L$ is determined based on a plurality of components $C_{L1}$-$C_{L6}$. The components $C_{L1}$-$C_{L6}$ are tabular functions of the inputs (the angle of attack α, the angle of sideslip β, the control surface positions, the stabilizer surface position, the flap position, the landing gear position, and the estimated Mach number $M_{MDL}$) and the body-axis lift coefficient $C_L$ is determined based on Equation 8 as:

$$C_L = C_{L1}(\alpha, M_{MDL}) + C_{L2}(\text{Flap}, M_{MDL}) + C_{L3}(\text{Gear}, M_{MDL}) + C_{L4}(\text{Spoiler}, \alpha, M_{MDL}) + C_{L5}(\text{stabilizer}, \alpha, M_{MDL}) \quad \text{Equation 8}$$

The body-axis thrust model 82 determines a body-axis propulsive lift, which is referred to as $T_{ZB}$ based on Equation 9 as:

$$T_{ZB} = G_{ZB} - R_D \sin \alpha \cos \beta \quad \text{Equation 9}$$

The dynamic pressure $Qbar_{lift}$ is based on the force along the vertical body-axis $Z_B$ (FIG. 2). Equation 10 determines the dynamic pressure $Qbar_{lift}$ as:

$$Qbar_{lift} = (N_Z W + T_{ZB}) / (C_L S_{ref}) \quad \text{Equation 10}$$

The dynamic pressure $Qbar_{drag}$ from the drag submodule 50 and the dynamic pressure $Qbar_{lift}$ from the lift submodule 52 are both received by the logic submodule 54. The logic submodule 54 estimates the model based dynamic pressure $Qbar_{MDL}$ based on at least one of the dynamic pressure $Qbar_{drag}$ from the drag submodule 50 and the dynamic pressure $Qbar_{lift}$. Specifically, the logic submodule 54 receives as input the estimated Mach number $M_{MDL}$ as well as the flap position. The flap position is an indication whether the trailing edge flaps 31 (FIG. 2) are retracted. In response to the estimated Mach number $M_{MDL}$ having a value that is greater than about 0.4 and the flaps 31 being in a retracted position, the logic submodule 54 selects the dynamic pressure $Qbar_{drag}$ from the drag submodule 50 as the model based dynamic pressure $Qbar_{MDL}$. In response to either the estimated Mach number $M_{MDL}$ being less than about 0.4, or the flaps 31 being in an extended position, the logic submodule 54 selects the dynamic pressure from the lift submodule 52 as the model based dynamic pressure $Qbar_{MDL}$.

The logic submodule 54 also includes hysteresis logic. In response to estimated Mach number $M_{MDL}$ having a value that is greater than about 0.4 by a margin of about 0.02, the hysteresis logic determines that the aircraft 18 is switching from low speed conditions to high speed conditions. Similarly, in response to estimated Mach number $M_{MDL}$ having a value that is equal to or less than about 0.4 by a margin of about 0.02, the hysteresis logic determines that the aircraft 18 is switching from high speed conditions to low speed conditions. The hysteresis logic may substantially prevent continuous toggling between two sources if the Mach number $M_{MDL}$ is near the 0.4 threshold.

The logic submodule 54 also includes a blending algorithm that provides a smooth transition as the model based dynamic pressure $Qbar_{MDL}$ switches from one source value to another. Specifically, a value of the model based dynamic pressure $Qbar_{MDL}$ is switched between the dynamic pressure $Qbar_{drag}$ and the dynamic pressure $Qbar_{lift}$ based on the blending algorithm, where the blending algorithm gradually changes the value of the model based dynamic pressure $Qbar_{MDL}$ over a period of time. The period of time to transition between the dynamic pressure values $Qbar_{drag}$ and $Qbar_{lift}$ is about several seconds. The blending algorithm may be based on any number of different approaches such as, but not limited to, a transient-free switch.

Figure 5:
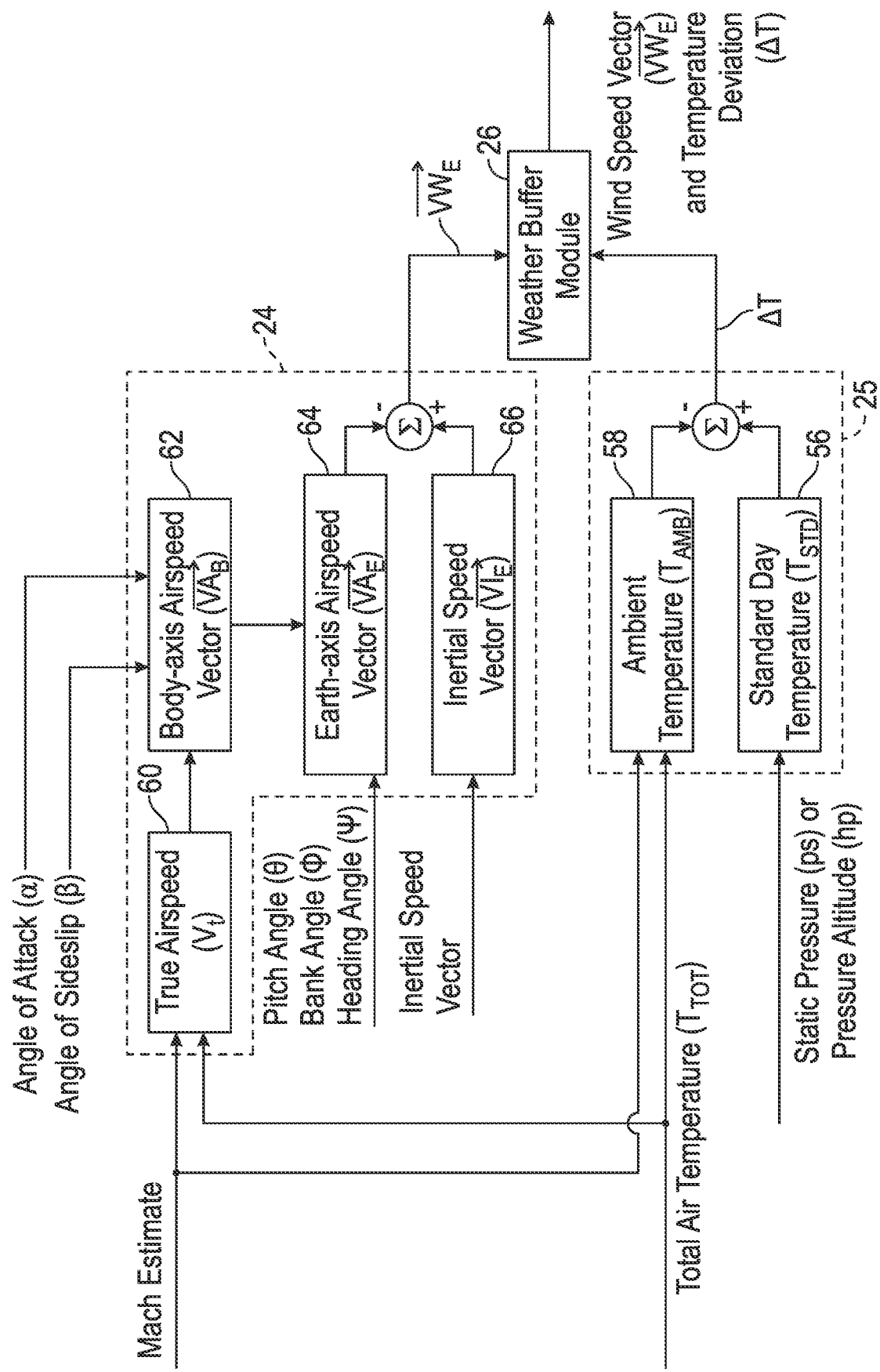
FIG. 5 is an exemplary block diagram of a wind module, a temperature module, and a weather buffer module shown in FIG. 1.

FIG. 5 is a block diagram of the wind module 24, the temperature module 25, and the weather buffer module 26 shown in FIG. 1. As explained below, the bridge based dynamic pressure $Qbar_{BRG}$ is determined based on a temperature deviation $\Delta T$, a sensed earth-axis inertial speed vector $\overrightarrow{VI_E}$, and an earth-axis wind speed vector $\overrightarrow{VW_E}$ as the aircraft 18 (FIG. 1) operates at extreme flight conditions. The temperature module 25 receives as input the total air temperature $T_{TOT}$, the static pressure ps (or the pressure altitude hp), and the estimated Mach number $M_{MDL}$. The temperature module 25 determines the temperature deviation $\Delta T$ based on the inputs. The temperature deviation $\Delta T$ is a difference between an ambient temperature $T_{AMB}$ and a standard day temperature $T_{STD}$. The temperature module 25 determines the standard day temperature $T_{STD}$ at a block 56 based on the static pressure ps or the pressure altitude hp. The ambient temperature $T_{AMB}$ is determined at block 58, and is determined by the total air temperature $T_{TOT}$ and the estimated Mach number $M_{MDL}$ based on Equation 11:

$$T_{AMB} = T_{TOT}/(1 + 0.2 M_{MDL}^2) \quad \text{Equation 11}$$

The wind module 24 includes an airspeed block 60, a body-axis airspeed vector block 62, an earth-axis airspeed vector block 64, and an inertial speed vector block 66. The airspeed block 60 determines a true airspeed Vt based on the total air temperature $T_{TOT}$ and the estimated Mach number $M_{MDL}$. The true airspeed Vt indicates the speed of the aircraft 18 relative to the air mass in which the aircraft 18 is flying, and the determined based on Equation 12 as:

$$Vt = 38.97 M_{MDL} \sqrt{T_{TOT}/(1 + 0.2 M_{MDL}^2)} \quad \text{Equation 12}$$

The body-axis airspeed vector block 62 receives as input the true airspeed Vt, the angle of attack α, and the angle of sideslip β, and determines a body-axis airspeed vector $\overrightarrow{VA_B}$. Specifically, the body-axis airspeed vector $\overrightarrow{VA_B}$ is determined based on Equation 13 as:

$$(\overrightarrow{VA_B} = ua\vec{i}_B + va\vec{j}_B + wa\vec{k}_B) \quad \text{Equation 13}$$

where $\vec{i}_B, \vec{j}_B, \vec{k}_B$ are unit vectors along the body-axis frames $X_B, Y_B, Z_B$, (illustrated in FIG. 2) respectively, and the three body-axis components of $\overrightarrow{VA_B}$ are expressed as:

$$ua = Vt \cos \alpha \cos \beta$$

$$va = Vt \sin \beta$$

$$wa = Vt \sin \alpha \cos \beta$$

The earth-axis airspeed vector block 64 receives as input the body-axis airspeed vector $\overrightarrow{VA_B}$, the pitch angle θ, the bank angle φ, and the heading angle Ψ, and determines an earth-axis airspeed vector $\overrightarrow{VA_E}$. Specifically, the earth-axis airspeed vector $\overrightarrow{VA_E}$ is determined based on an body-to-earth Euler transformation, which is expressed in Equation 14 as:

$$\begin{bmatrix} VA_{NORTH} \\ VA_{EAST} \\ VA_{VERT} \end{bmatrix} = \begin{bmatrix} \cos\psi\cos\theta & \cos\psi\sin\theta\sin\phi - \sin\psi\cos\phi & \cos\psi\sin\theta\cos\phi + \sin\psi\sin\phi \\ \sin\psi\cos\theta & \sin\psi\sin\theta\sin\phi + \cos\psi\cos\phi & \sin\psi\sin\theta\cos\phi - \cos\psi\sin\phi \\ -\sin\theta & \cos\theta\sin\phi & \cos\theta\cos\phi \end{bmatrix} \begin{bmatrix} ua \\ va \\ wa \end{bmatrix} \quad 5$$

where $VA_{NORTH_{BRG}}$ is the airspeed component in the north direction (i.e., the axis $X_E$ seen in FIG. 2) $VA_{EAST_{BRG}}$ is the airspeed component in the east direction (i.e., the axis $Y_E$ seen in FIG. 2), and $VA_{VERT_{BRG}}$ is the airspeed component in the vertical direction (i.e., the axis $Z_E$ seen in FIG. 2). The earth-axis airspeed vector $\vec{VA_E}$ is determined based on Equation 15 as:

$$\vec{VA_E} = VA_{NORTH}\vec{i}_E + VA_{EAST}\vec{j}_E + VA_{VERT}\vec{k}_E \quad \text{Equation 15}$$

where $\vec{i}_E, \vec{j}_E, \vec{k}_E$ are unit vectors along earth axes $X_E, Y_E, Z_E$, respectively.

Finally, the earth-axis wind speed vector $\vec{VW_E}$ is determined based on a difference between the earth-axis inertial speed vector $\vec{VI_E}$ and the earth-axis airspeed vector $\vec{VA_E}$. The sensed earth-axis inertial speed vector $\vec{VI_E}$ is determined by Equation 16 as:

$$\vec{VI_E} = VI_{NORTH}\vec{i}_E + VI_{EAST}\vec{j}_E + VI_{VERT}\vec{k}_E \quad \text{Equation 16}$$

Figure 6:
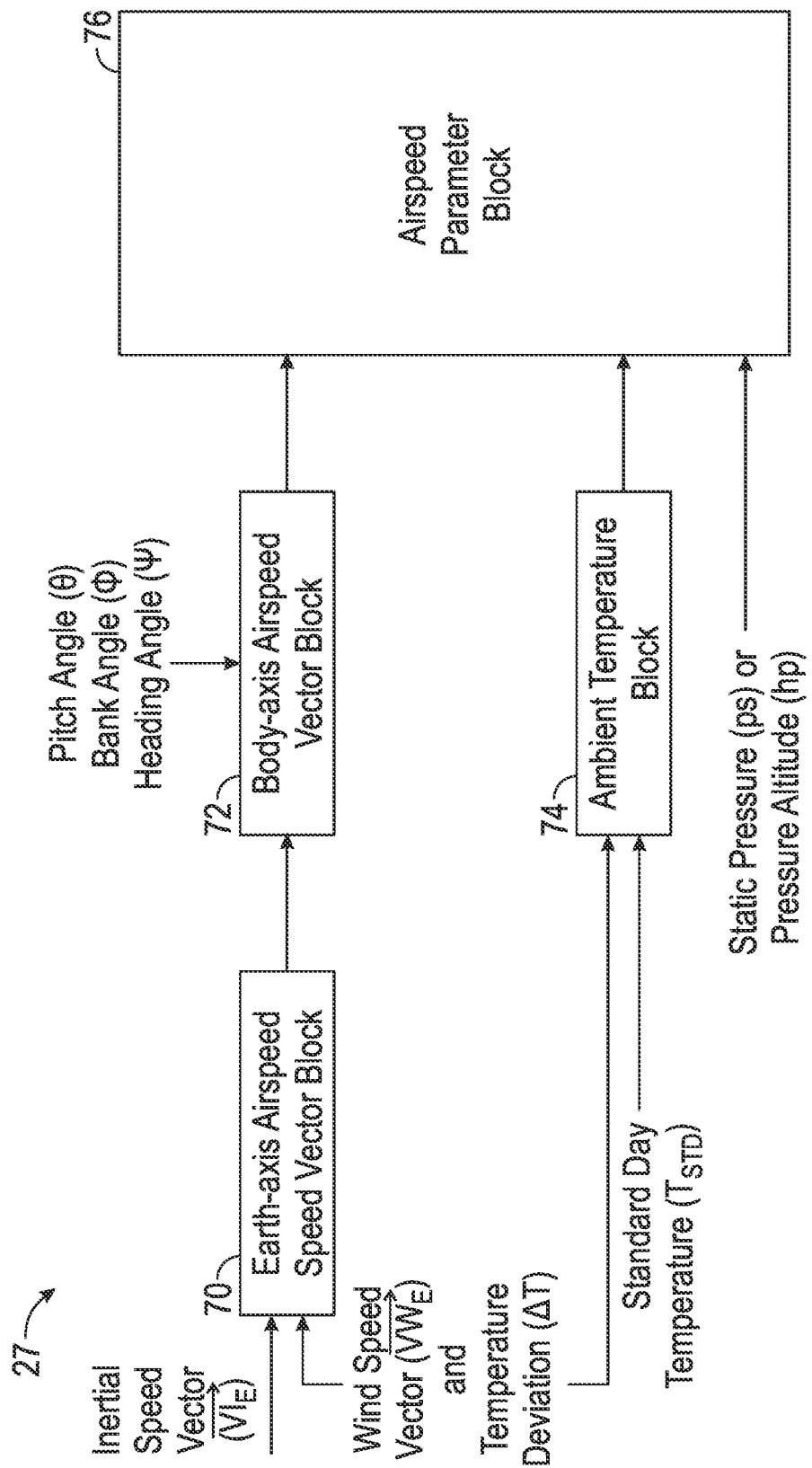
FIG. 6 is an exemplary block diagram of a bridge logic module shown in FIG. 1.

As seen in FIG. 5, the earth-axis wind speed vector $\vec{VW_E}$ and the temperature deviation $\Delta T$ are both received as input by the weather buffer module 26. The weather buffer module 26 sends the earth-axis wind speed vector $\vec{VW_E}$ and the temperature deviation $\Delta T$ to the bridge logic module 27 (FIG. 1). Turning now to FIG. 6, the bridge logic module 27 is illustrated. The bridge logic module 27 includes an earth-axis airspeed vector block 70, a body-axis airspeed vector block 72, an ambient temperature block 74, and an airspeed parameter block 76.

The earth-axis airspeed vector block 70 receives as input the sensed earth-axis inertial speed vector $\vec{VI_E}$ and the earth-axis wind speed vector $\vec{VW_E}$, and determines a bridge based earth-axis airspeed vector $\vec{VA_{E_{BRG}}}$ based on the input. The earth-axis airspeed vector $\vec{VA_{E_{BRG}}}$ is determined based on Equation 17 as:

$$\vec{VA_{E_{BRG}}} = \vec{VI_E} - \vec{VW_E} \quad \text{Equation 17}$$

The earth-axis airspeed vector $\vec{VA_{E_{BRG}}}$ is based upon the north (i.e., axis $X_E$ as shown in FIG. 2), east (i.e., axis $Y_E$ as shown in FIG. 2), and vertical (i.e., axis $Z_E$ as shown in FIG. 2) airspeeds.

The bridge based body-axis airspeed vector block 72 receives as input the earth-axis airspeed vector $\vec{VA_{E_{BRG}}}$ from the earth-axis airspeed vector block 70, the pitch angle $\theta$, the bank angle $\phi$, and the heading angle $\Psi$, and determines a bridge based body-axis airspeed vector $\vec{VA_{B_{BRG}}}$ based on the input. Specifically, the body-axis airspeed vector $\vec{VA_{B_{BRG}}}$ is determined based on an earth-to-body Euler transformation, which is expressed in Equation 18 as:

$$\begin{bmatrix} ua_{BRG} \\ va_{BRG} \\ wa_{BRG} \end{bmatrix} = \begin{bmatrix} \cos\psi\cos\theta & \sin\psi\cos\theta & -\sin\theta \\ \cos\psi\sin\theta\sin\phi - \sin\psi\cos\phi & \sin\psi\sin\theta\sin\phi + \cos\psi\cos\phi & \cos\theta\sin\phi \\ \cos\psi\sin\theta\cos\phi + \sin\psi\sin\phi & \sin\psi\sin\theta\cos\phi - \cos\psi\sin\phi & \cos\theta\cos\phi \end{bmatrix} \begin{bmatrix} VA_{NORTH_{BRG}} \\ VA_{EAST_{BRG}} \\ VA_{VERT_{BRG}} \end{bmatrix}$$

where $ua_{BRG}, va_{BRG}$, and $wa_{BRG}$ represent body components of the body-axis airspeed vector $\vec{VA_{B_{BRG}}}$ such as $$\vec{VA_{B_{BRG}}} = ua_{BRG}\vec{i}_B + va_{BRG}\vec{j}_B + wa_{BRG}\vec{k}_B \quad \text{Equation 19}$$

where $VA_{NORTH_{BRG}}$ is the earth-axis airspeed component in the north direction (i.e., the axis $X_E$ seen in FIG. 2) $VA_{EAST_{BRG}}$ is the earth-axis airspeed component in the east direction (i.e., the axis $Y_E$ seen in FIG. 2), and $VA_{VERT_{BRG}}$ is the earth-axis airspeed component in the vertical direction (i.e., the axis $Z_E$ seen in FIG. 2). The ambient temperature block 74 receives as input the standard day temperature $T_{STD}$ and the temperature deviation $\Delta T$, and determines a bridge based ambient temperature $T_{BRG}$ based on the input. The ambient temperature $T_{BRG}$ is determined based on Equation 20 as:

$$T_{BRG} = T_{STD} + \Delta T \quad \text{Equation 20}$$

Continuing to refer to FIG. 6, the airspeed parameter block 76 receives as input the bridge based ambient temperature $T_{BRG}$, the static pressure ps or the pressure altitude hp, and the body-axis airspeed vector $\vec{VA_{B_{BRG}}}$. The airspeed parameter block 76 then determines a bridge based true airspeed $Vt_{BRG}$, Mach number $M_{BRG}$, the dynamic pressure $Qbar_{BRG}$, equivalent airspeed $Veas_{BRG}$, impact pressure $QC_{BRG}$, calibrated airspeed $Vcas_{BRG}$, angle of attack $\alpha_{BRG}$, and angle of sideslip $\beta_{BRG}$ based on Equations 21-28:

True airspeed (knots): $Vt_{BRG} = \sqrt{u_{BRG}^2 + v_{BRG}^2 + w_{BRG}^2}$    Equation 21

Mach number: $M_{BRG} = Vt_{BRG}/(38.97\sqrt{T_{BRG}})$    Equation 22

Dynamic pressure (lbs/ft$^2$): $Qbar_{BRG} = 0.7 M_{BRG}^2 ps$    Equation 23

Equivalent airspeed (knots): $Veas_{BRG} = Qbar_{BRG}^2/295.374$    Equation 24

Impact pressure (lbs/ft$^2$): $Qc_{BRG} = [(1+0.2M_{BRG}^2)^{7/2} - 1]ps$    Equation 25

Calibrated airspeed (knots): $Vcas_{BRG} = 661.5\sqrt{5[(Qc_{BRG}/p_0+1)^{2/7}-1]}$    Equation 26 where $P_0$ is standard day pressure at sea level.

Angle of attack: $\alpha_{BRG} = \tan^{-1}(wa_{BRG}/ua_{BRG})$    Equation 27

Angle of sideslip: $\beta_{BRG} = \tan^{-1}(va_{BRG}/\sqrt{u_{BRG}^2 + w_{BRG}^2})$    Equation 28

The plurality of parameters determined by the airspeed parameter block 76 expressed in equations 21-28 are utilized based on the aircraft is operating at unsteady or highly dynamic conditions. This is because the model based dynamic pressure $Qbar_{MDL}$ estimated by the airspeed estimated module 22 may no longer be accurate.

Figure 7:
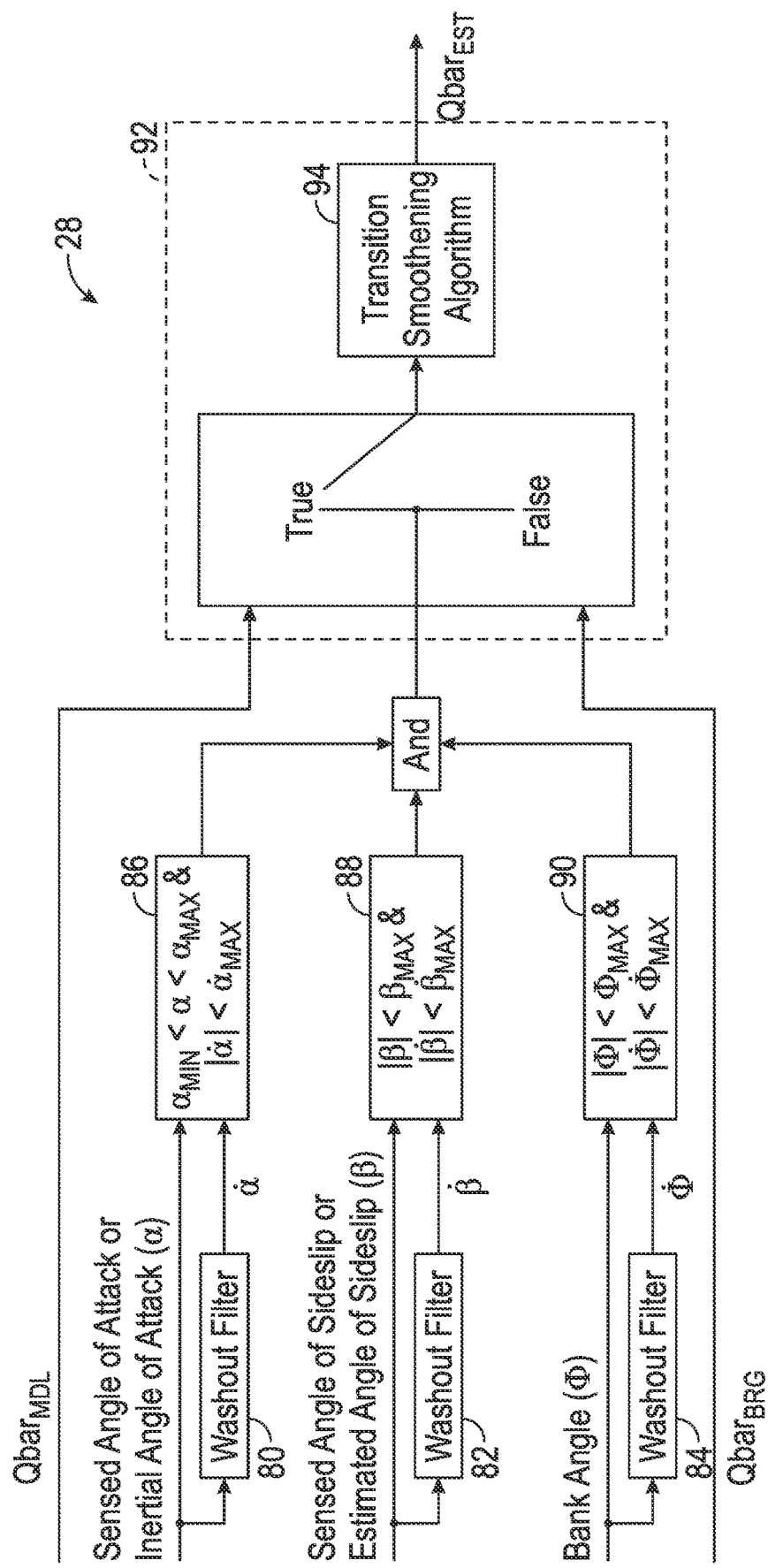
FIG. 7 is an exemplary block diagram of a selection logic module shown in FIG. 1.

Turning back to FIG. 1, the selection logic module 28 receives as input the angle of attack $\alpha$, the angle of sideslip $\beta$, the bank angle $\phi$, the bridge based dynamic pressure $Qbar_{BRG}$, and the model based dynamic pressure $Qbar_{MDL}$. FIG. 7 is an illustration of the selection logic module 28. As seen in FIG. 7, the selection module 28 includes a washout filter 80 for the angle of attack $\alpha$, a washout filter 82 for the angle of sideslip β, and a washout filter 84 for the bank angle φ. The selection module 28 also includes an angle of attack steadiness block 86, an angle of sideslip steadiness block 88, and a bank angle steadiness block 90, which are used to assess steadiness of the aircraft 18 (FIG. 1) during operation, and is explained in greater detail below. The selection module 28 also includes a logical block 92 and a selection switch and transition smoothing block 94.

The washout filters 80, 82, 84 are high-pass filters that captures the derivative of an input's low frequency contents. The washout filter 80 receives as input the angle of attack α and determines a derivative of the angle of attack $\dot{\alpha}$. The washout filter 82 receives as input the angle of sideslip β and determines a derivative of the angle of sideslip $\dot{\beta}$. The washout filter 84 receives as input the bank angle φ and determines a derivative of the bank angle $\dot{\phi}$.

The selection module 28 assesses the steadiness of the aircraft 18 based on at least one of the angle of attack α, the angle of sideslip β, and the bank angle φ, where the steadiness is indicative of the extreme flight conditions of the aircraft 18. Specifically, the angle of attack steadiness block 86 receives as input the angle of attack α and the derivative of the angle of attack $\dot{\alpha}$, and determines if the angle of attack α is greater than a minimum angle of attack $\alpha_{MIN}$ and less than a maximum angle of attack $\alpha_{MAX}$ (i.e., $\alpha_{MIN} < \alpha < \alpha_{MAX}$). In one non-limiting embodiment, the minimum angle of attack $\alpha_{MIN}$ is about zero degrees and the maximum angle of attack $\alpha_{MAX}$ is about ten degrees. The angle of attack steadiness block 86 also determines if an absolute value of the derivative of the angle of attack $|\dot{\alpha}|$ is less than a maximum derivative value $\dot{\alpha}_{MAX}$. In one exemplary embodiment, the maximum value $\dot{\alpha}_{MAX}$ is about 2°/second.

The output of the angle of attack steadiness block 86 is expressed as a true or false statement. In response to determining that the angle of attack α is greater than a minimum angle of attack $\alpha_{MIN}$, less than a maximum angle of attack $\alpha_{MAX}$, and the absolute value of the derivative of the angle of attack is less than the maximum derivative value $\dot{\alpha}_{MAX}$, the angle of attack steadiness block 86 returns a true value, which is indicative of the aircraft 18 (FIG. 1) operating at steady flight conditions. However, in response to the angle of attack α, the absolute value of the derivative of the angle of attack $|\dot{\alpha}|$, or both being out of range, the angle of attack steadiness block 86 returns a false value, which indicates extreme flight conditions. The output may also indicate by how much the angle of attack α and the derivative of the angle of attack α are out of range.

Similarly, the angle of sideslip steadiness block 88 receives as put the angle of sideslip β and the derivative of the angle of sideslip $\dot{\beta}$, and determines if the absolute value of the angle of sideslip $|\beta|$ is less than a maximum angle of sideslip $\beta_{MAX}$ (i.e., $|\beta| < \beta_{MAX}$) In one non-limiting embodiment, the maximum angle of sideslip $\beta_{MAX}$ is about four degrees. The angle of sideslip steadiness block 88 also determines if an absolute value of the derivative of the angle of sideslip $|\dot{\beta}|$ is less than a maximum derivative value $\dot{\beta}_{MAX}$. In one example, the maximum value $\dot{\beta}_{MAX}$ is about 2°/second.

The output of the angle of sideslip steadiness block 88 is expressed as a true or false statement. In response to determining that the absolute value of the angle of sideslip $|\beta|$ is less than a maximum angle of sideslip and the absolute value of the derivative of the angle of sideslip $|\dot{\beta}|$ is less than a maximum derivative value $\dot{\beta}_{MAX}$, the angle of sideslip steadiness block 88 returns a true value, which is indicative of the aircraft 18 (FIG. 1) operating at steady flight conditions. However, in response to the absolute value of the angle of sideslip β, the absolute value of derivative of the angle of sideslip $\dot{\beta}$, or both being out of range, the angle of sideslip block 88 returns a false value, which indicates extreme flight conditions.

Finally, the bank angle steadiness block 90 receives as input the bank angle φ and the derivative of the bank angle $\dot{\phi}$, and determines if the absolute value of the bank angle $|\phi|$ is less than a maximum bank angle $\phi_{MAX}$. In one example, the maximum bank angle $\phi_{MAX}$ is about five degrees. The bank angle steadiness block 90 also determines if the absolute value of the derivative of the bank angle $|\dot{\phi}|$ is less than a maximum value $\dot{\phi}_{MAX}$. In one non-limiting embodiment, the maximum value $\dot{\phi}_{MAX}$ is about 2°/second.

The output of the bank angle steadiness block 90 is expressed as a true or false statement. In response to determining that the absolute value of the bank angle $|\phi|$ is less than a maximum bank angle $\phi_{MAX}$ and of the absolute value of the derivative of the bank angle $|\dot{\phi}|$ is less than a maximum value $\dot{\phi}_{MAX}$, the bank angle steadiness block 90 returns a true value, which is indicative of the aircraft 18 (FIG. 1) operating at steady flight conditions. However, in response to the absolute value of the bank angle $|\phi|$, the absolute value of the derivative of the bank angle $|\dot{\phi}|$, or both being out of range, the bank angle steadiness block 90 returns a false value, which indicates extreme flight conditions.

The outputs of the angle of attack steadiness block 86, the angle of sideslip steadiness block 88, and the bank angle steadiness block 90 are then sent to the selection switch and transition smoothing block 94. In response to determining that each of the conditions in the angle of attack steadiness block 86, the angle of sideslip steadiness block 88, and the bank angle steadiness block 90 are true, the block 94 determines that the aircraft 18 is operating at aerodynamically steady conditions. Accordingly, the block 94 selects the model based dynamic pressure $Qbar_{MDL}$ estimated by the airspeed estimation module 22 (FIG. 1). In response to determining at least one of the conditions in the angle of attack steadiness block 86, the angle of sideslip steadiness block 88, and the bank angle steadiness block 90 are false, the block 94 determines that the aircraft 18 (FIG. 1) is operating at unsteady or highly dynamic conditions. Accordingly, the block 94 selects the bridge based dynamic pressure $Qbar_{BRG}$.

The selection switch and transition smoothing block 94 provides a smooth transition as the estimated dynamic pressure $Qbar_{EST}$ switches from one source value to another. Specifically, a value of the estimated dynamic pressure $Qbar_{EST}$ is switched between the model based dynamic pressure $Qbar_{MDL}$ and the bridge based dynamic pressure $Qbar_{BRG}$ based on the logical block 92. The block 94 gradually changes the value of the estimated dynamic pressure $Qbar_{EST}$ over a period of time. The period of time to transition between the model based dynamic pressure values $Qbar_{MDL}$ and $Qbar_{BRG}$ is about several seconds.

Turning back to FIG. 1, either the model based dynamic pressure $Qbar_{MDL}$ or the bridge based dynamic pressure $Qbar_{BRG}$ is set as the estimated dynamic pressure $Qbar_{EST}$. The estimated dynamic pressure $Qbar_{EST}$ is then sent to the airspeed parameter estimation module 29. The airspeed parameter estimation module 29 then determines the airspeed parameters, which include the estimated Mach number $M_{EST}$, the equivalent airspeed $Veas_{EST}$, the impact pressure $Qc_{EST}$, the calibrated airspeed $Vcas_{EST}$, and the true airspeed $Vt_{EST}$ of the aircraft 18. The airspeed parameters are used to constantly calculate the airspeed of the aircraft 18. The true airspeed $Vt_{EST}$ represents the aircraft 18 velocity relative to a free air stream, and the equivalent airspeed $Veas_{EST}$ is the true airspeed corrected by the local air density. The calibrated airspeed $Vcas_{EST}$ is computed based on the impact pressure $Qc_{EST}$.

The estimated Mach number $M_{EST}$ is determined based on Equation 29, the equivalent airspeed $Veas_{EST}$ is based on Equation 30, the impact pressure $Qc_{EST}$ is based on Equation 31, the calibrated airspeed $Vcas_{EST}$ is based on Equation 32, and the true airspeed $Vt_{EST}$ is based on Equation 33:

$$M_{EST} = 1.195\sqrt{Qbar_{EST}/ps} \qquad \text{Equation 29}$$

$$Veas_{EST} = \sqrt{295.374 Qbar_{EST}} \qquad \text{Equation 30}$$

$$Qc_{EST} = [(1+0.2 M_{EST}^2)^{7/2} - 1]ps \qquad \text{Equation 31}$$

$$Vcas_{EST} = 661.5\sqrt{5[(Qc_{EST}/p_0 + 1)^{2/7} - 1]} \qquad \text{Equation 32}$$

$$Vt_{EST} = 38.97 M_{EST}\sqrt{T_{TOT}/(1+0.2 M_{EST}^2)} \qquad \text{Equation 33}$$

where the equivalent airspeed $Veas_{EST}$, the calibrated airspeed $Vcas_{EST}$ and the true airspeed $Vt_{EST}$ are all measured in knots, the dynamic pressure $Qbar_{EST}$ and the impact pressure $Qc_{EST}$ are both in pounds per square foot, $p_0$ represents standard day pressure at sea level, and the total air temperature $T_{TOT}$ is expressed in Kelvin. Therefore, in response to determining the aircraft 18 is operating at extreme flight conditions, the airspeed system 10 estimates the plurality of airspeed parameters based on the bridge based dynamic pressure ($Qbar_{BRG}$). Similarly, in response to determining that the aircraft 18 is operating at the steady flight conditions, the airspeed system 10 estimates the plurality of airspeed parameters based on the model based dynamic pressure ($Qbar_{MDL}$).

Referring generally to the figures, the disclosed airspeed system provides a reliable approach for estimating the airspeed, without the need to depend upon traditional pitot probe measurements. Furthermore, the disclosed airspeed system includes a weather buffer module, The weather buffer module estimates synthetic airspeed parameters and synthetic angles of attack and sideslip in response to the aircraft operating at extreme flight conditions. Accordingly, the airspeed system provides a relatively accurate estimate of the airspeed parameters, even when the aircraft is operating at conditions where traditional airspeed models may not be able to accurately determine airspeed parameters. Indeed, traditional systems may freeze or keep the airspeed estimate constant while the aircraft is in the dynamic state. However, if the aircraft continues to operate in the dynamic state for more than a few seconds, this may affect the accuracy of the readings. The disclosed system provides a robust approach for estimating the angle of attack and sideslip using the inertial speed vector, the wind speed vector, and the temperature deviation based on the standard day temperature when the aircraft operates in the dynamic state.

While the forms of apparatus and methods herein described constitute preferred examples of this invention, it is to be understood that the invention is not limited to these precise forms of apparatus and methods, and the changes may be made therein without departing from the scope of the invention.

What is claimed is:

1. A system for estimating a plurality of airspeed parameters including an estimated dynamic pressure $Qbar_{EST}$, wherein the plurality of airspeed parameters are for constantly calculating an airspeed of an aircraft, the system comprising:
   one or more processors; and
   a memory coupled to the one or more processors, the memory storing data comprising a database and program code that, when executed by the one or more processors, causes the system to:
   receive a plurality of operating parameters that each represent an operating condition of the aircraft;
   determine a model based dynamic pressure ($Qbar_{MDL}$) based on the operating parameters, wherein the model based dynamic pressure ($Qbar_{MDL}$) is based on steady flight conditions of the aircraft;
   determine a bridge based dynamic pressure ($Qbar_{BRG}$) based on at least a temperature deviation $\Delta T$ and an inertial speed vector, wherein the bridge based dynamic pressure ($Qbar_{BRG}$) is based on extreme flight conditions of the aircraft;
   assess a steadiness of the aircraft during operation based on at least one of an angle of attack, an angle of sideslip, and a bank angle, wherein the steadiness is indicative of the extreme flight conditions of the aircraft;
   determine that the aircraft is operating at either the steady flight conditions or the extreme flight conditions based on the steadiness;
   in response to determining the aircraft is operating at the extreme flight conditions, estimate the plurality of airspeed parameters based on the bridge based dynamic pressure ($Qbar_{BRG}$), wherein the estimated dynamic pressure $Qbar_{EST}$ is set to the bridge based dynamic pressure ($Qbar_{BRG}$); and
   in response to determining the aircraft is operating at the steady flight conditions, estimate the plurality of airspeed parameters based on the model based dynamic pressure ($Qbar_{MDL}$), wherein the estimated dynamic pressure $Qbar_{EST}$ is set to the model based dynamic pressure ($Qbar_{MDL}$).

2. The system of claim 1, wherein the temperature deviation is based on a difference between an ambient temperature ($T_{AMB}$) and a standard day temperature ($T_{STD}$).

3. The system of claim 1, wherein the bridge based dynamic pressure ($Qbar_{BRG}$) is determined based on an earth-axis wind speed vector, wherein the earth-axis wind speed vector is determined based on a difference between the inertial speed vector and an earth-axis airspeed vector.

4. The system of claim 3, wherein the earth-axis airspeed vector is determined based on:

$$\vec{VA}_E = VA_{NORTH}\vec{i}_E + VA_{EAST}\vec{j}_E + VA_{VERT}\vec{k}_E$$

wherein $\vec{VA}_E$ is the earth-axis airspeed vector, $VA_{NORTH_{BRG}}$ is an earth-axis airspeed component in a north direction, $VA_{EAST_{BRG}}$ is the earth-axis airspeed component in an east direction, $VA_{VERT_{BRG}}$ is the earth-axis airspeed component in a vertical direction, $\vec{i}_E, \vec{j}_E, \vec{k}_E$ are unit vectors along earth axes $X_E, Y_E, Z_E$, of the aircraft respectively.

5. The system of claim 1, wherein assessing the steadiness of the aircraft is based on an angle of attack and an absolute value of a derivative of the angle of attack.

6. The system of claim 5, wherein the system is further caused to:
   return a true value that is indicative that the aircraft is operating at the steady flight conditions in response to determining the angle of attack is greater than a minimum angle of attack, less than a maximum angle of attack, and that the absolute value of the derivative of the angle of attack is less than a maximum derivative value.

7. The system of claim 1, wherein assessing the steadiness of the aircraft is based on an absolute value of an angle of sideslip and an absolute value of a derivative of the angle of sideslip.

8. The system of claim 7, wherein the system is further caused to:
return a true value that is indicative that the aircraft is operating at the steady flight conditions in response to determining the absolute value of the angle of sideslip is less than a maximum angle of sideslip and that the absolute value of the derivative of the angle of sideslip is less than a maximum derivative value.

9. The system of claim 1, wherein assessing the steadiness of the aircraft is based on an absolute value of bank angle and an absolute value of a derivative of the bank angle.

10. The system of claim 9, wherein the system is further caused to:
return a true value that is indicative that the aircraft is operating at the steady flight conditions in response to determining the absolute value of the bank angle is less than a maximum bank angle and that the absolute value of the derivative of the bank angle is less than a maximum derivative value.

11. The system of claim 1, wherein the model based dynamic pressure ($Qbar_{MDL}$) is determined based on a stability-axis drag coefficient ($C_D$), and wherein the stability-axis drag coefficient ($C_D$) quantifies a stability-axis drag of the aircraft created during high speed conditions.

12. The system of claim 1, wherein the model based dynamic pressure ($Qbar_{MDL}$) is determined based on a body-axis lift coefficient ($C_L$), and wherein the body-axis lift coefficient ($C_L$) corresponds to a lift of the aircraft created along a vertical body-axis during low speed conditions.

13. The system of claim 1, wherein a value the estimated dynamic pressure ($Qbar_{EST}$) switches between the model based dynamic pressure ($Qbar_{MDL}$) and the bridge based dynamic pressure ($Qbar_{BRG}$).

14. The system of claim 1, wherein the plurality of airspeed parameters include a Mach number ($M_{EST}$), an equivalent airspeed ($Veas_{EST}$), an impact pressure ($Qc_{EST}$), a calibrated airspeed ($Vcas_{EST}$), and a true airspeed ($Vt_{EST}$) of the aircraft.

15. A method of estimating a plurality of airspeed parameters including an estimated dynamic pressure $Qbar_{EST}$, wherein the plurality of airspeed parameters are for constantly calculating an airspeed of an aircraft, the method comprising:
receiving a plurality of operating parameters that each represent an operating condition of the aircraft by a computer;
determining, by the computer, a model based dynamic pressure ($Qbar_{MDL}$) based on the operating parameters, wherein the model based dynamic pressure ($Qbar_{MDL}$) is based on steady flight conditions of the aircraft;
determining, by the computer, a bridge based dynamic pressure ($Qbar_{BRG}$) based on at least a temperature deviation, a wind speed vector and an inertial speed vector, wherein the bridge based dynamic pressure ($Qbar_{BRG}$) is based on extreme flight conditions of the aircraft;
assessing a steadiness of the aircraft during operation based on at least one of an angle of attack, an angle of sideslip, and a bank angle, wherein the steadiness is indicative of the extreme flight conditions of the aircraft;
determining, by the computer, that the aircraft is operating at the extreme flight conditions based on the steadiness;
in response to determining the aircraft is operating at the extreme flight conditions, estimating, by the computer, the plurality of airspeed parameters based on the bridge based dynamic pressure ($Qbar_{BRG}$)), wherein the estimated dynamic pressure $Qbar_{EST}$ is set to the bridge based dynamic pressure ($Qbar_{BRG}$): and
in response to determining the aircraft is operating at the steady flight conditions, estimate the plurality of airspeed parameters based on the model based dynamic pressure ($Qbar_{MDL}$), wherein the estimated dynamic pressure $Qbar_{EST}$ is set to the model based dynamic pressure ($Qbar_{MDL}$).

16. The method of claim 15, comprising determining the temperature deviation is based on a difference between an ambient temperature ($T_{AMB}$) and a standard day temperature ($T_{STD}$).

17. The method of claim 15, comprising determining the bridge based dynamic pressure ($Qbar_{BRG}$) based on an earth-axis wind speed vector, wherein the earth-axis wind speed vector is determined based on a difference between the inertial speed vector and an earth-axis airspeed vector.

18. The method of claim 17, comprising determining the earth-axis airspeed vector based on:

$$\vec{VA_E} = VA_{NORTH}\vec{i_E} + VA_{EAST}\vec{j_E} + VA_{VERT}\vec{k_E}$$

wherein $\vec{VA_E}$ is the earth-axis airspeed vector, $VA_{NORTH_{BRG}}$ is an earth-axis airspeed component in a north direction, $VA_{EAST_{BRG}}$ is the earth-axis airspeed component in an east direction, $VA_{VERT_{BRG}}$ is the earth-axis airspeed component in a vertical direction, $\vec{i_E}, \vec{j_E}, \vec{k_E}$ are unit vectors along earth axes $X_E, Y_E, Z_E$, of the aircraft respectively.

19. The method of claim 15, further comprising:
switching a value of the estimated dynamic pressure ($Qbar_{EST}$) between the model based dynamic pressure ($Qbar_{MDL}$) and the bridge based dynamic pressure ($Qbar_{BRG}$).

20. The method of claim 15, wherein the plurality of airspeed parameters include a Mach number ($M_{EST}$), an equivalent airspeed ($Veas_{EST}$), an impact pressure ($Qc_{EST}$), a calibrated airspeed ($Vcas_{EST}$), and a true airspeed ($Vt_{EST}$) of the aircraft.

* * * * *